United States Patent
Donnell (10) Patent No.: US 12,085,909 B2
(45) Date of Patent: Sep. 10, 2024

(54) REMOTELY CONTROLLED POWER ASSEMBLY

(71) Applicant: John Donnell, Readyville, TN (US)

(72) Inventor: John Donnell, Readyville, TN (US)

( * ) Notice: Subject to any disclaimer, the term of this patent is extended or adjusted under 35 U.S.C. 154(b) by 494 days.

(21) Appl. No.: 17/553,267

(22) Filed: Dec. 16, 2021

(65) Prior Publication Data
US 2023/0195067 A1  Jun. 22, 2023

(51) Int. Cl.
*F24C 7/08* (2006.01)
*G05B 19/042* (2006.01)
*H02J 3/12* (2006.01)
*H02J 3/14* (2006.01)

(52) U.S. Cl.
CPC .......... *G05B 19/0425* (2013.01); *F24C 7/081* (2013.01); *H02J 3/12* (2013.01); *H02J 3/14* (2013.01); *Y04S 20/242* (2013.01)

(58) Field of Classification Search
CPC ................ G05B 19/0425; G05B 15/02; G05B 2219/2613; G05B 19/042; F24C 7/081; F24C 7/08; H02J 3/12; H02J 3/14; Y04S 20/242; H05B 6/6426
USPC ........................................................ 307/140
See application file for complete search history.

(56) References Cited

U.S. PATENT DOCUMENTS

| | | | |
|---|---|---|---|
| 4,323,762 A | 4/1982 | Ervin | |
| 5,434,368 A | 7/1995 | Hoffman | |
| 5,734,206 A * | 3/1998 | Keizer | F24C 7/08 307/142 |
| 5,939,992 A | 8/1999 | Devries | |
| 2010/0238639 A1 | 9/2010 | Butt | |
| 2010/0308666 A1 | 12/2010 | Raby | |

* cited by examiner

Primary Examiner — Rexford N Barnie
Assistant Examiner — Xuan Ly (57) ABSTRACT

A remotely controlled power assembly includes a power box that is mountable to an appliance. A female outlet is attachable to the power box thereby facilitating the female outlet to be electrically coupled to a power cord for the appliance. A master power cord is attachable to the power box and the master power cord is electrically coupled to an appliance power source. A switching relay is in electrical communication with each of the female electrical outlet and the master power cord. The switching relay is actuatable into an engaged condition to turn on the appliance and a disengaged condition to turn off the appliance. A receiver is in electrical communication with the switching relay. A remote control is in remote communication with the receiver for remotely turning the appliance on and off.

9 Claims, 7 Drawing Sheets

REMOTELY CONTROLLED POWER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to remote power devices and more particularly pertains to a new remote power device for remotely enabling or disabling an appliance. The device includes a power box which includes a female electrical outlet for receiving a power cord for an appliance and a master power cord for receiving power from an appliance power source. The device includes a switching relay that is electrically coupled between the female electrical outlet and the master power cord and a receiver that is electrically coupled to the switching relay. A remote control is provided which is in communication with the receiver for remotely actuating or de-actuating the appliance.

(2) Description of Related Art Including Information Disclosed Unde®37 CFR 1.97 and 1.98

The prior art relates to remote power devices including a keyed switch for disconnecting appliances from a power source. The prior art discloses a variety of switching devices for disconnecting appliances from a power source which each at least includes a manually operated switch. The prior art discloses a variety of automatic appliance shut off devices that each includes electronic means of detecting a trigger event. The prior art discloses an appliance shut-off that includes a key pad for entering an access code.

BRIEF SUMMARY OF THE INVENTION

An embodiment of the disclosure meets the needs presented above by generally comprising a power box that is mountable to an appliance. A female outlet is attachable to the power box thereby facilitating the female outlet to be electrically coupled to a power cord for the appliance. A master power cord is attachable to the power box and the master power cord is electrically coupled to an appliance power source. A switching relay is in electrical communication with each of the female electrical outlet and the master power cord. The switching relay is actuatable into an engaged condition to turn on the appliance and a disengaged condition to turn off the appliance. A receiver is in electrical communication with the switching relay. A remote control is in remote communication with the receiver for remotely turning the appliance on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
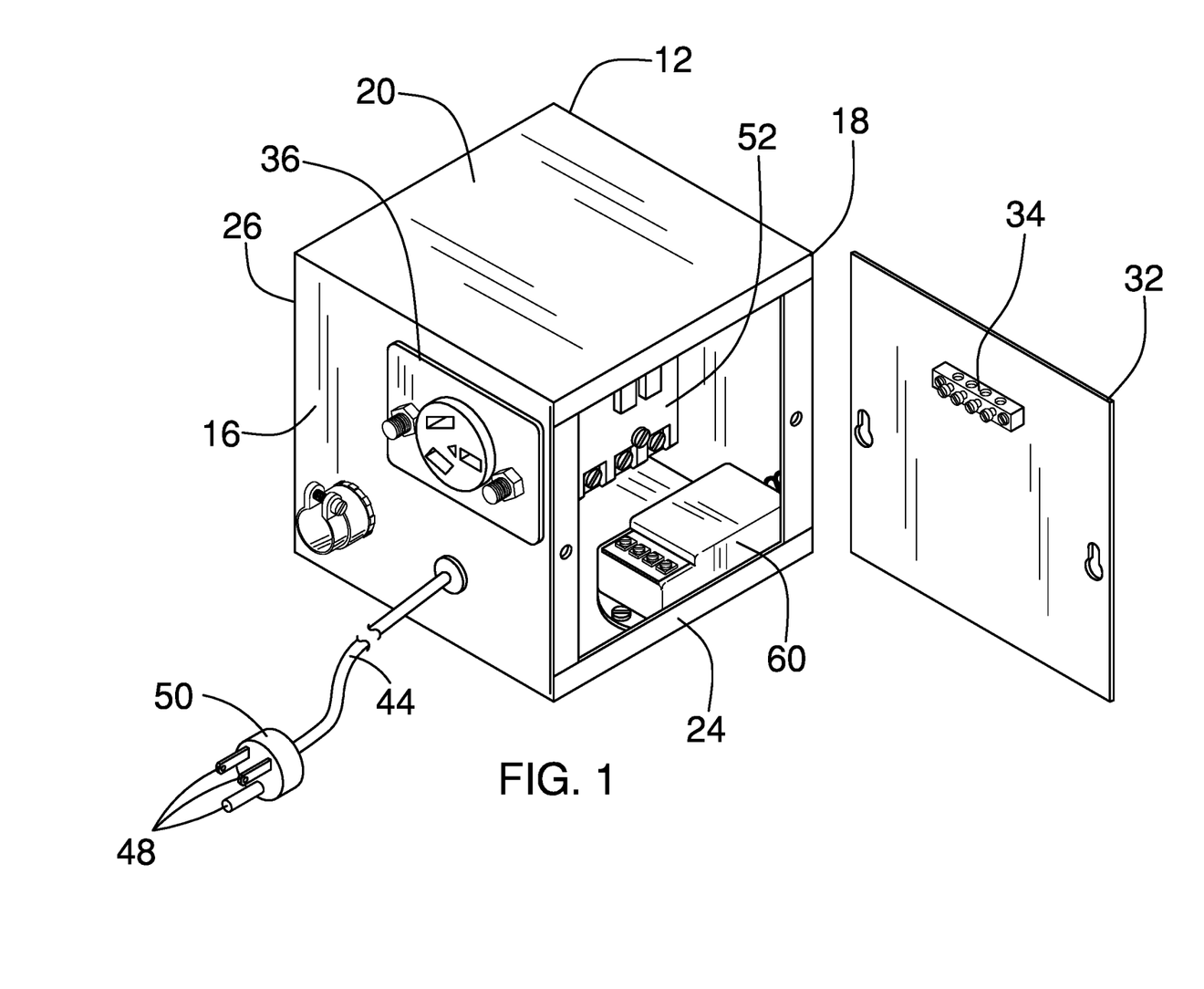
FIG. 1 is a perspective view of a remotely controlled power assembly according to an embodiment of the disclosure.
Figure 2:
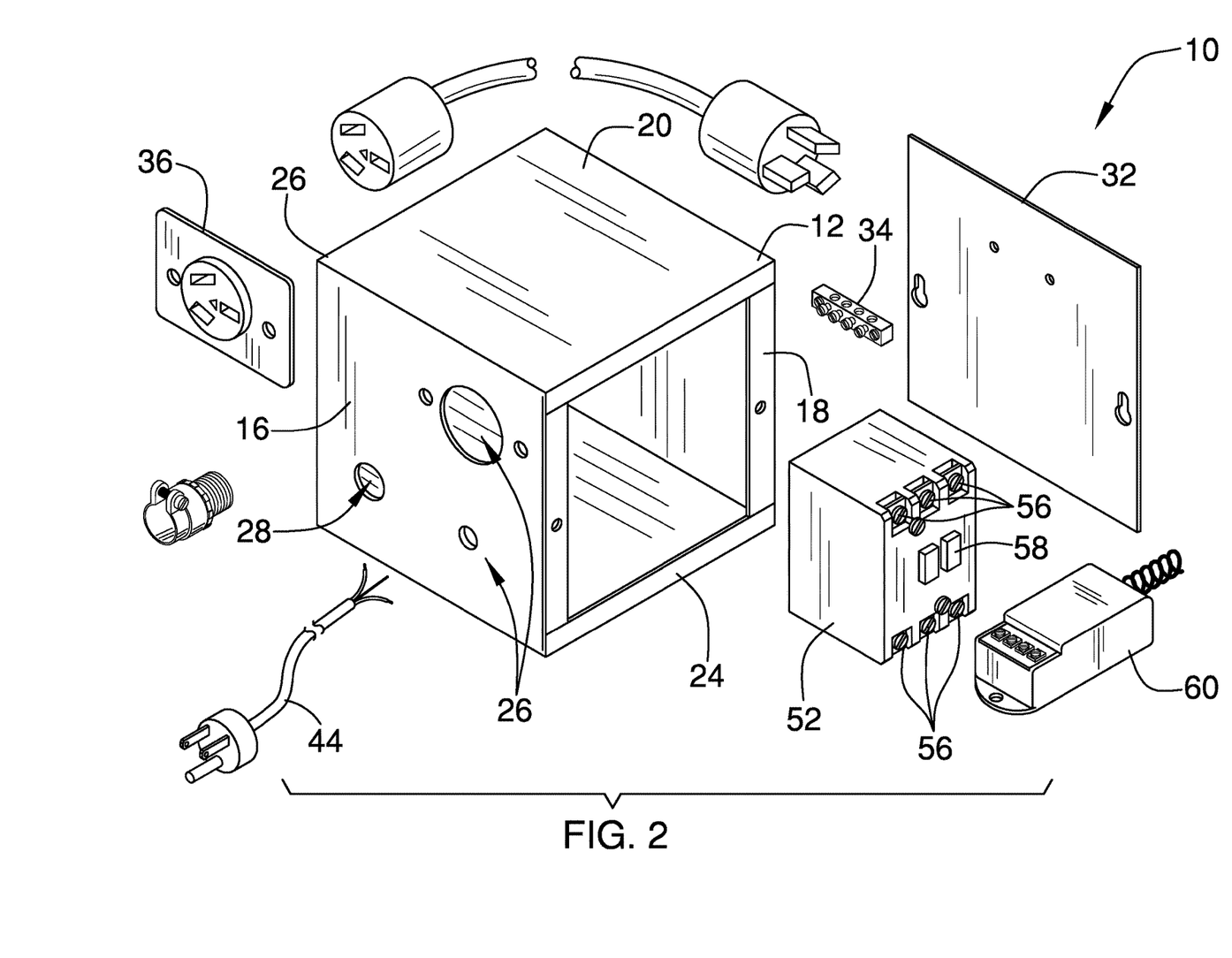
FIG. 2 is an exploded perspective view of an embodiment of the disclosure.
Figure 3:
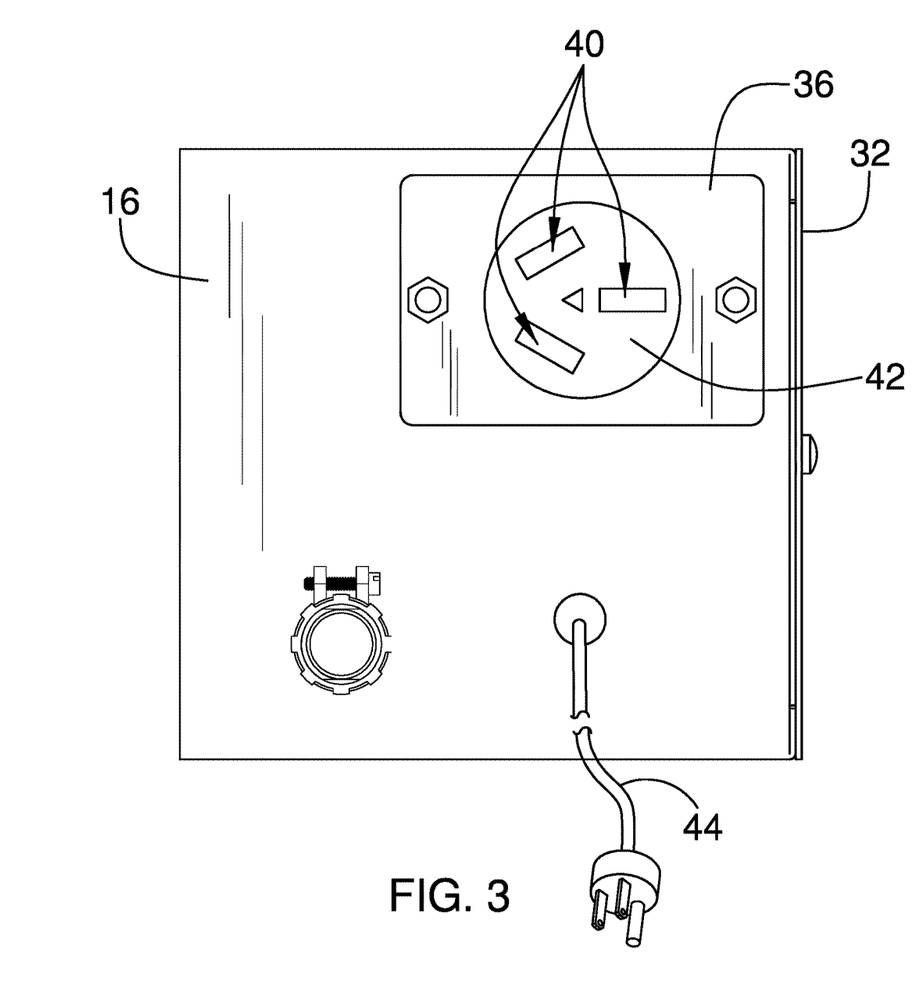
FIG. 3 is a front view of an embodiment of the disclosure.
Figure 4:
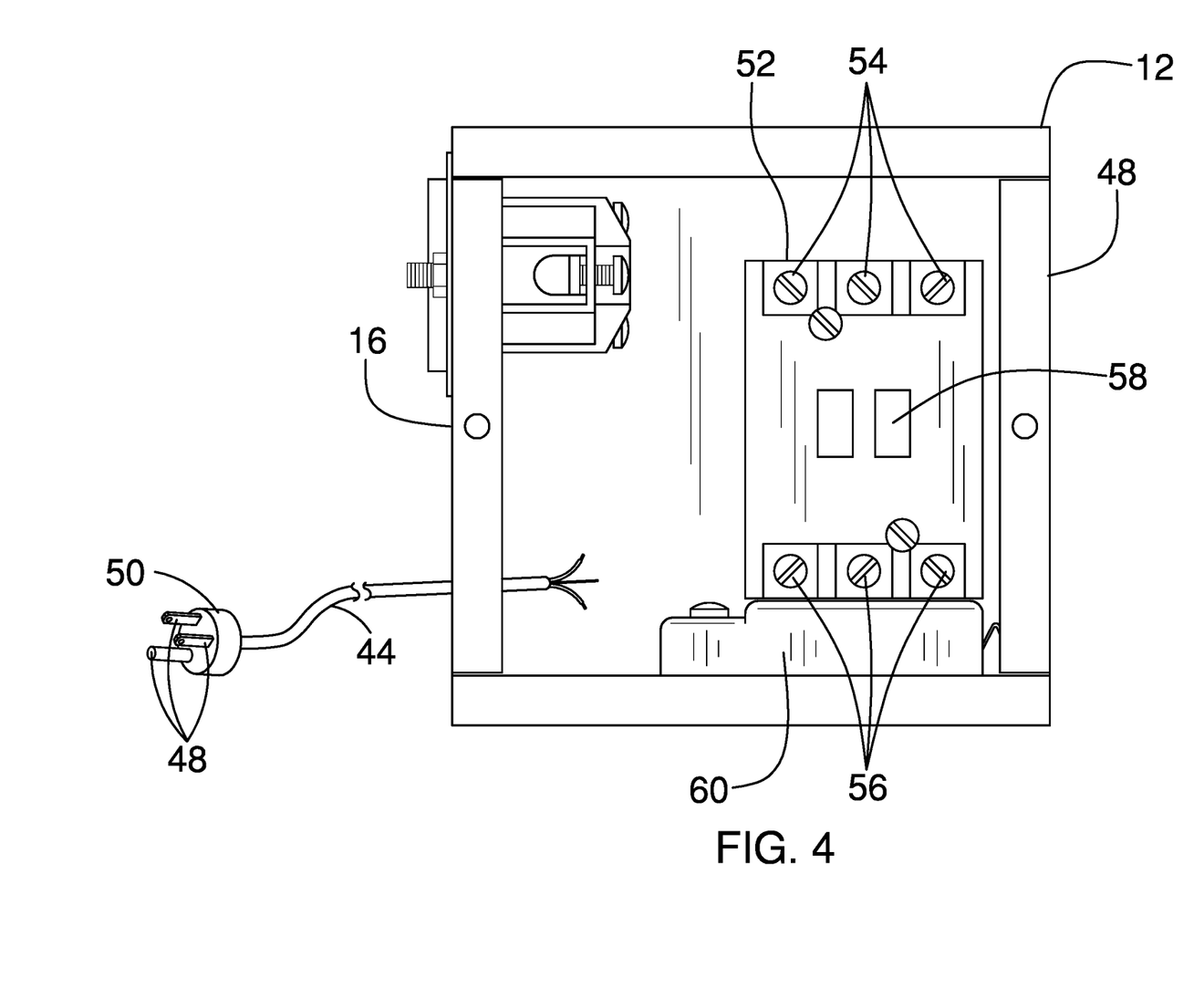
FIG. 4 is a left side view of an embodiment of the disclosure.
Figure 5:
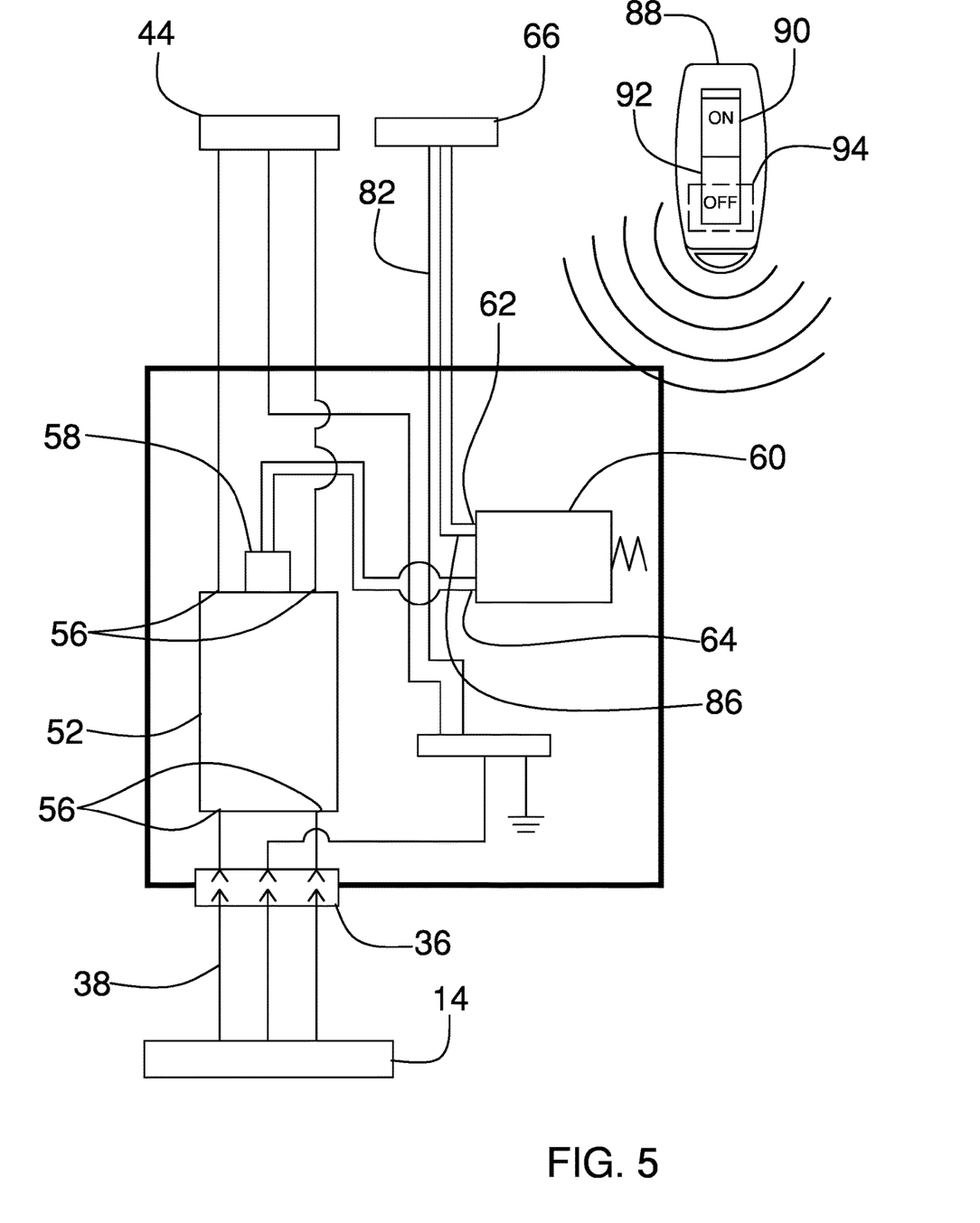
FIG. 5 is a schematic view of an embodiment of the disclosure.
Figure 6:
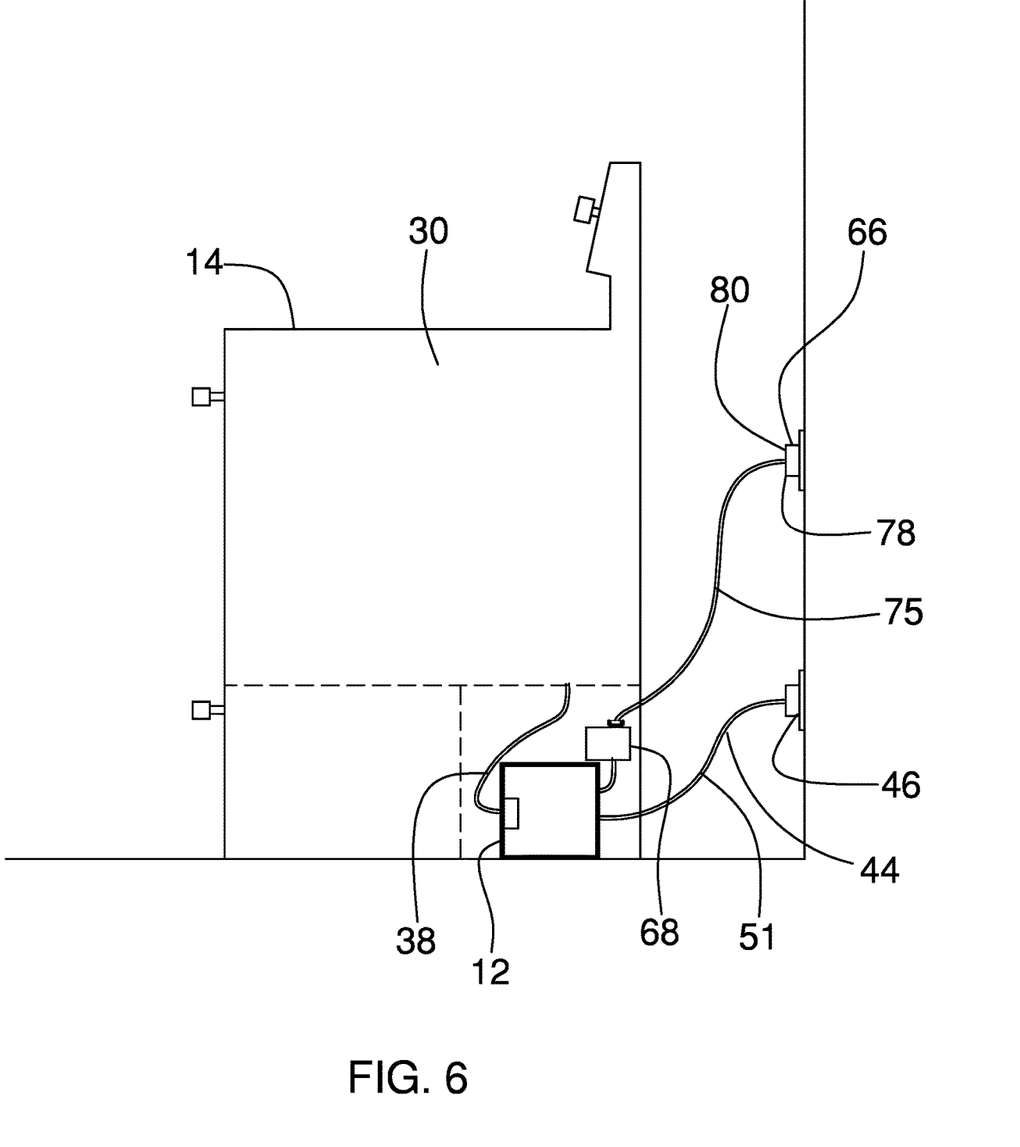
FIG. 6 is a perspective in-use view of an embodiment of the disclosure.
Figure 7:
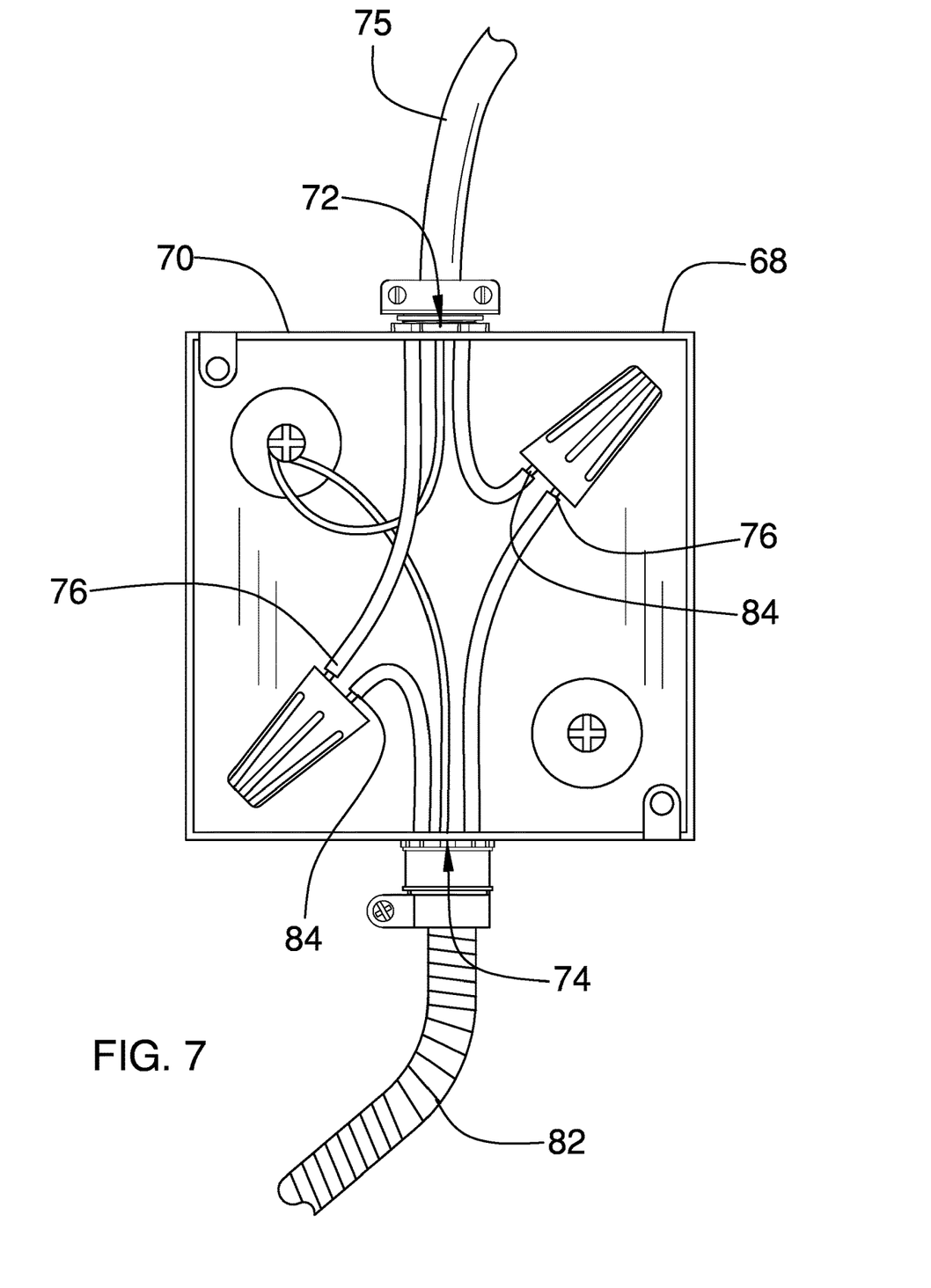
FIG. 7 is an interior view of a junction box of an embodiment of the disclosure.

With reference now to the drawings, and in particular to FIGS. 1 through 7 thereof, a new remote power device embodying the principles and concepts of an embodiment of the disclosure and generally designated by the reference numeral 10 will be described.

As best illustrated in FIGS. 1 through 7, the remotely controlled power assembly 10 generally comprises a power box 12 that is mountable to an appliance 14. The power box 12 has a front wall 16, a back wall 18 and a perimeter wall 20 extending between the front wall 16 and the back wall 18, and the perimeter wall 20 has a first lateral side 22 and a second lateral side 24. The second lateral side 24 is substantially open to access an interior of the power box 12. The front wall 16 has a pair of first holes 26 each extending through the front wall 16 and each of the first holes 26 is positioned adjacent to the second lateral side 24. The front wall 16 has a second hole 28 extending through the front wall 16 and the second hole 28 is positioned adjacent to the first lateral side 22.

The first lateral side 22 is mounted to an outer wall 30 of the appliance 14 and the power box 12 is comprised of an electrically conductive material such that the power box 12 is in electrical communication with a ground of the appliance 14. The appliance 14 may be an electric kitchen stove or other type of appliance that could potentially pose a fire hazard. Additionally, the appliance 14 may be located in a residence that is occupied by an individual that is suffering from a degenerative brain disorder, such as Alzheimer's or the like, who may be susceptible to inadvertently leaving the appliance 14 turned on for an extended period of time. A cover 32 is removably attachable to the power box 12 and the cover 32 is comprised of an electrically conductive material such that the cover 32 is in electrical communication with the ground of the appliance 14 when the cover 32 is attached to the power box 12. A grounding block 34 is attached to the cover 32 such that the grounding block 34 is in electrical communication with the cover 32.

A female electrical outlet 36 is attachable to the power box 12 thereby facilitating the female electrical outlet 36 to be electrically coupled to a power cord 38 for the appliance 14. The female electrical outlet 36 has a plurality of sockets 40 that are recessed into a front face 42 of the female electrical outlet 36. Furthermore, the sockets 40 are arranged to define a circular pattern on the front face 42 of the female electrical outlet 36 thereby facilitating the female electrical outlet 36 to accommodate a 240.0 volt power plug. The female electrical outlet 36 is aligned with a respective one of the first holes 26 having the front face 42 being exposed on the front wall 16 of the power box 12 and the female electrical outlet 36 is electrically coupled to the grounding block 34.

A master power cord 44 is attachable to the power box 12 and the master power cord 44 is electrically coupled to an appliance power source 46. The appliance power source 46 may be 240.0 volt outlet of an electrical system of the building in which the appliance 14 is being employed. The master power cord 44 has a plurality of contacts 48 each being disposed on a distal end 50 of the mater power cord 44. The contacts 48 are arranged in a circular pattern thereby facilitating the master power cord 44 to accommodate a 240.0 volt power plug. The master power cord 44 extends outwardly from a respective one of the first holes 26 and the master power cord 44 is electrically coupled to the grounding block 34.

A switching relay 52 is positioned inside the power box 12 and the switching relay 52 is in electrical communication with each of the female electrical outlet 36 and the master power cord 44. The switching relay 52 is actuatable into an engaged condition such that the female electrical outlet 36 is in electrical communication with the master power cord 44 thereby placing the appliance 14 in electrical communication with the appliance power source 46. The switching relay 52 is actuatable into a disengaged condition such that the female electrical outlet 36 is inhibited from is in electrical communication with the master power cord 44. In this way the appliance 14 is inhibited from being in electrical communication with the appliance power source 46.

The switching relay 52 has a plurality of input terminals 54, a plurality of output terminals 56 and a control terminal 58. Each of the input terminals 54 is electrically coupled to the master power cord 44 and each of the output terminals 56 is electrically coupled to the female electrical outlet 36. The input terminals 54 are in electrical communication with the output terminals 56 when the switching relay 52 is in the engaged condition. Conversely, the input terminals 54 are removed from electrical communication with the output terminals 56 when the switching relay 52 is in the disengaged condition. The switching relay 52 is electrically coupled to the grounding block 34 and the switching relay 52 may be a solid state switching relay that would commonly be employed in 240.0 volt residential electrical circuits.

A receiver 60 is positioned within the power box 12 and the receiver 60 is in electrical communication with the switching relay 52. The receiver 60 receives an on input and the receiver 60 receives an off input. The switching relay 52 is actuated into the engaged condition when the receiver 60 receives the on input. Conversely, the switching relay 52 is actuated into the disengaged condition when the receiver 60 receives the off input. The receiver 60 has a power input 62 and a control output 64, and the control output 64 is electrically coupled to the control terminal 58 on the switching relay 52. The power input 62 is in electrical communication with a control power source 66 that is discrete from the appliance power source 46. The receiver 60 may include a radio frequency receiver or the like which has an operational range of at least 300.0 feet.

A junction box 68 is mountable to the appliance 14 and the junction box 68 has an outer wall 70. The outer wall 70 has a first aperture 72 extending into an interior of the junction box 68 and the outer wall 70 has a second aperture 74 extending into the interior of the junction box 68. A control power cord 75 is provided which has a first end 76 and a second end 78. The control power cord 75 extends through the first aperture 72 such that the first end 76 is positioned within the junction box 68. A male plug 80 is electrically coupled to the second end 78 thereby facilitating the male plug 80 to be electrically coupled to the control power source 66. The control power source 66 may be a 120.0 volt electrical outlet of the electrical system of the building in which the appliance 14 is employed. Additionally, the junction box 68 may be an electrical junction box that conforms to the National Electrical Code enforced in the United States.

A power conductor 82 is provided that has a primary end 84 and a secondary end 86. The power conductor 82 extends through the second aperture 74 such that the secondary end 86 is positioned within the junction box 68. The primary end 84 is electrically coupled to the first end 76 of the control power cord 75. The power conductor 82 extends through the second hole 28 in the front wall 16 of the power box 12 such that the secondary end 86 is positioned inside of the power box 12. The secondary end 86 is electrically coupled to the power input 62 of the receiver 60 such that the receiver 60 is electrically coupled to the control power source 66. As is most clearly shown in FIG. 7, the first end 76 of the control power cord 75 may be electrically spliced to the primary end 84 of the power conductor 82 in a manner that conforms to the National Electrical Code enforced in the United States.

A remote control 88 is provided that is in remote communication with the receiver 60 and the remote control 88 is actuatable to broadcast an on command to the receiver 60. The receiver 60 receives the on input when the receiver 60 receives the on command. The remote control 88 broadcasts an off command to the receiver 60 and the receiver 60 receives the off input when the receiver 60 receives the off command. The remote control 88 includes an on button 90, an off button 92 and a transmitter 94 that is electrically coupled to each of the on button 90 and the off button 92.

The transmitter 94 is in wireless communication with the receiver 60 and the transmitter 94 broadcasts the on command when the on button 90 is depressed. In this way the remote control 88 facilitates the appliance 14 to be remotely actuated. Conversely, the transmitter 94 broadcasts the off command when the off button 92 is depressed to facilitate the appliance 14 to be remotely de-actuated. The transmitter 94 may comprise a radio frequency transmitter or the like and the transmitter 94 may have an operational range of at least 300.0 feet.

In use, the control power cord 75 is plugged into the control power source 66, the power cord 38 for the appliance 14 is plugged into the female electrical outlet 36 and the master power cord 44 is plugged into the appliance power source 46. The on button 90 of the remote control 88 is depressed to facilitate electrical power to be routed to the appliance 14. In this way the appliance 14 can be employed for normal operation. The off button 92 of the remote control 88 is depressed to interrupt electrical power to the appliance 14. In this way the appliance 14 is inhibited from being employed for normal operation. Thus, a caregiver can prevent a user that is suffering from mental decline from employing the appliance 14 without supervision.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remotely controlled power assembly for remotely actuating or de-actuating a kitchen appliance, said assembly comprising:
   a power box being mountable to an appliance;
   a female outlet being attachable to said power box thereby facilitating said female outlet to be electrically coupled to a power cord for the appliance;
   a master power cord being attachable to said power box, said master power cord being electrically coupled to an appliance power source;
   a switching relay being positioned inside said power box, said switching relay being in electrical communication with each of said female electrical outlet and said master power cord, said switching relay being actuatable into an engaged condition such that said female electrical outlet is in electrical communication with said master power cord thereby placing the appliance in electrical communication with the appliance power source, said switching relay being actuatable into a disengaged condition such that said female electrical outlet is inhibited from being in electrical communication with said master power cord thereby inhibiting the appliance from being in electrical communication with the appliance power source;
   a receiver being positioned within said power box, said receiver being in electrical communication with said switching relay, said receiver receiving an on input, said receiver receiving an off input, said switching relay being actuated into said engaged condition when said receiver receives said on input, said switching relay being actuated into said disengaged condition when said receiver receives said off input; and
   a remote control being in remote communication with said receiver, said remote control being actuatable to broadcast an on command to said receiver, said receiver receiving said on input when said receiver receives said on command, said remote control broadcasting an off command to said receiver, said receiver receiving said off input when said receiver receives said off command.

2. The assembly according to claim 1, wherein:
   said power box has a front wall, a back wall and a perimeter wall extending between said front wall and said back wall, said perimeter wall having a first lateral side and a second lateral side, said second lateral side being substantially open to access an interior of said power box, said front wall having a pair of first holes each extending through said front wall, each of said first holes being positioned adjacent to said second lateral side, said front wall having a second hole extending through said front wall, said second hole being positioned adjacent to said first lateral side, said first lateral side being mounted to an outer wall of the appliance, said power box being comprised of an electrically conductive material such that said power box is in electrical communication with a ground of the appliance;
   said assembly includes a cover being removably attachable to said power box, said cover being comprised of an electrically conductive material such that said cover is in electrical communication with the ground of the appliance when said cover is attached to said power box; and
   a grounding block being attached to said cover such that said grounding block is in electrical communication with said cover.

3. The assembly according to claim 2, wherein:
   said master power cord has a plurality of contacts extending outwardly from a distal end of said master power cord, said contacts being arranged in a circular pattern thereby facilitating said master power cord to accommodate a 240.0 volt power plug; and
   said master power cord extends outwardly from a respective one of said first holes, said master power cord being electrically coupled to said grounding block.

4. The assembly according to claim 2, wherein:
   said female outlet has a plurality of sockets being recessed into a front face of said female outlet, said sockets being arranged to define a circular pattern on said front face female electrical outlet thereby facilitating said female electrical outlet to accommodate a 240.0 volt power plug; and
   said female electrical outlet is aligned with a respective one of said first holes having said front face being exposed on said front wall of said power box, said female electrical outlet being electrically coupled to said grounding block.

5. The assembly according to claim 1, wherein said switching relay has a plurality of input terminals, a plurality of output terminals and a control terminal, each of said input terminals being electrically coupled to said male electrical plug, each of said output terminals being electrically coupled to said female electrical outlet, said input terminals being in electrical communication with said output terminals when said switching relay is in said engaged condition, said input terminals being removed from electrical communication with said output terminals when said switching relay is in said disengaged condition.

6. The assembly according to claim 5, wherein said receiver has a power input and a control output, said control output being electrically coupled to said control terminal on said switching relay, said power input being in electrical communication with a control power source being discrete from the appliance power source.

7. The assembly according to claim 2, further comprising:
a junction box being mountable to the appliance, said junction box having an outer wall, said outer wall having a first aperture extending into an interior of said junction box, said outer wall having a second aperture extending into said interior of said junction box;
a control power cord having a first end and a second end, said control power cord extending through said first aperture such that said first end is positioned within said junction box, said second end having a male plug being electrically coupled thereto thereby facilitating said male plug to be electrically coupled to the control power source; and
a power conductor having a primary end and a secondary end, said power conductor extending through said second aperture such that said secondary end is positioned within said junction box, said primary end being electrically coupled to said first end of said control power cord, said power conductor extending through said second hole in said front wall of said power box such that said secondary end is positioned inside of said power box, said secondary end being electrically coupled to said power input of said receiver such that said receiver is electrically coupled to the control power source.

8. The assembly according to claim 6, wherein said remote control includes an on button, an off button and a transmitter being electrically coupled to each of said on button and said off button, said transmitter being in wireless communication with said receiver, said transmitter broadcasting said on command when said on button is depressed wherein said remote control is configured to facilitate the appliance to be remotely actuated, said transmitter broadcasting said off command when said off button is depressed wherein said remote control is configured to facilitate the appliance to be remotely de-actuated.

9. A remotely controlled power assembly for remotely actuating or de-actuating a kitchen appliance, said assembly comprising:
a power box being mountable to an appliance, said power box having a front wall, a back wall and a perimeter wall extending between said front wall and said back wall, said perimeter wall having a first lateral side and a second lateral side, said second lateral side being substantially open to access an interior of said power box, said front wall having a pair of first holes each extending through said front wall, each of said first holes being positioned adjacent to said second lateral side, said front wall having a second hole extending through said front wall, said second hole being positioned adjacent to said first lateral side, said first lateral side being mounted to an outer wall of the appliance, said power box being comprised of an electrically conductive material such that said power box is in electrical communication with a ground of the appliance;
a cover being removably attachable to said power box, said cover being comprised of an electrically conductive material such that said cover is in electrical communication with the ground of the appliance when said cover is attached to said power box;
a grounding block being attached to said cover such that said grounding block is in electrical communication with said cover;
a female outlet being attachable to said power box thereby facilitating said female outlet to be electrically coupled to a power cord for the appliance, said female outlet having a plurality of sockets being recessed into a front face of said female outlet, said sockets being arranged to define a circular pattern on said front face female electrical outlet thereby facilitating said female electrical outlet to accommodate a 240.0 volt power plug, said female electrical outlet being aligned with a respective one of said first holes having said front face being exposed on said front wall of said power box, said female electrical outlet being electrically coupled to said grounding block;
a master power cord being attachable to said power box, said master power cord being electrically coupled to an appliance power source, said master power cord having a plurality of contacts extending outwardly from a distal end of said master power cord, said contacts being arranged in a circular pattern thereby facilitating said master power cord to accommodate a 240.0 volt power plug, said master power cord extending outwardly from a respective one of said first holes, said master power cord being electrically coupled to said grounding block;
a switching relay being positioned inside said power box, said switching relay being in electrical communication with each of said female electrical outlet and said master power cord, said switching relay being actuatable into an engaged condition such that said female electrical outlet is in electrical communication with said master power cord thereby placing the appliance in electrical communication with the appliance power source, said switching relay being actuatable into a disengaged condition such that said female electrical outlet is inhibited from being in electrical communication with said master power cord thereby inhibiting the appliance from being in electrical communication with the appliance power source, said switching relay having a plurality of input terminals, a plurality of output terminals and a control terminal, each of said input terminals being electrically coupled to said male electrical plug, each of said output terminals being electrically coupled to said female electrical outlet, said input terminals being in electrical communication with said output terminals when said switching relay is in said engaged condition, said input terminals being removed from electrical communication with said output terminals when said switching relay is in said disengaged condition, said switching relay being electrically coupled to said ground block;
a receiver being positioned within said power box, said receiver being in electrical communication with said switching relay, said receiver receiving an on input, said receiver receiving an off input, said switching relay being actuated into said engaged condition when said receiver receives said on input, said switching relay being actuated into said disengaged condition when said receiver receives said off input, said receiver having a power input and a control output, said control output being electrically coupled to said control terminal on said switching relay, said power input being in electrical communication with a control power source being discrete from the appliance power source, said receiver being electrically coupled to said grounding block;

a junction box being mountable to the appliance, said junction box having an outer wall, said outer wall having a first aperture extending into an interior of said junction box, said outer wall having a second aperture extending into said interior of said junction box;

a control power cord having a first end and a second end, said control power cord extending through said first aperture such that said first end is positioned within said junction box, said second end having a male plug being electrically coupled thereto thereby facilitating said male plug to be electrically coupled to the control power source;

a power conductor having a primary end and a secondary end, said power conductor extending through said second aperture such that said secondary end is positioned within said junction box, said primary end being electrically coupled to said first end of said control power cord, said power conductor extending through said second hole in said front wall of said power box such that said secondary end is positioned inside of said power box, said secondary end being electrically coupled to said power input of said receiver such that said receiver is electrically coupled to the control power source; and a remote control being in remote communication with said receiver, said remote control being actuatable to broadcast an on command to said receiver, said receiver receiving said on input when said receiver receives said on command, said remote control broadcasting an off command to said receiver, said receiver receiving said off input when said receiver receives said off command, said remote control including an on button, an off button and a transmitter being electrically coupled to each of said on button and said off button, said transmitter being in wireless communication with said receiver, said transmitter broadcasting said on command when said on button is depressed wherein said remote control is configured to facilitate the appliance to be remotely actuated, said transmitter broadcasting said off command when said off button is depressed wherein said remote control is configured to facilitate the appliance to be remotely de-actauted.

\* \* \* \* \*